United States Patent
Maus et al.

(12) 
(10) Patent No.: US 6,519,930 B1
(45) Date of Patent: Feb. 18, 2003

(54) METHOD AND CONFIGURATION FOR MONITORING AN $NO_x$-STORAGE DEVICE

(75) Inventors: Wolfgang Maus, Bergisch Gladbach (DE); Rolf Brück, Bergisch Gladbach (DE)

(73) Assignee: Emitec Gesellschaft fuer Emissions Technologie mbH, Lohmar (DE)

( * ) Notice: Subject to any disclaimer, the term of this patent is extended or adjusted under 35 U.S.C. 154(b) by 0 days.

(21) Appl. No.: 09/440,740

(22) Filed: Nov. 16, 1999

Related U.S. Application Data

(63) Continuation of application No. PCT/EP98/01848, filed on Mar. 30, 1998.

(30) Foreign Application Priority Data

Apr. 9, 1997 (DE) .......................................... 197 14 715
Aug. 25, 1997 (DE) .......................................... 197 36 967

(51) Int. Cl.[7] ................................................. F01N 3/00
(52) U.S. Cl. .............................. 60/274; 60/295; 60/297
(58) Field of Search ........................... 60/274, 276, 277, 60/285, 295, 297

(56) References Cited

U.S. PATENT DOCUMENTS

| | | | |
|---|---|---|---|
| 5,255,511 A | | 10/1993 | Maus et al. |
| 5,339,628 A | | 8/1994 | Maus et al. |
| 5,355,671 A | | 10/1994 | Maus et al. |
| 5,402,641 A | | 4/1995 | Katoh et al. |
| 5,404,719 A | * | 4/1995 | Araki et al. .................. 60/276 |
| 5,437,153 A | * | 8/1995 | Takeshima et al. ........... 60/276 |
| 5,474,746 A | | 12/1995 | Maus et al. |
| 5,771,686 A | * | 6/1998 | Pischinger et al. ........... 60/274 |
| 6,032,461 A | * | 5/2000 | Kinugasa et al. ............. 60/295 |
| 6,305,161 B1 | * | 10/2001 | Takanohashi et al. ......... 60/301 |
| 6,438,947 B2 | * | 8/2002 | Ludwig et al. ............... 60/285 |

FOREIGN PATENT DOCUMENTS

| | | |
|---|---|---|
| DE | 26 43 739 C2 | 3/1978 |
| DE | 41 29 893 A1 | 3/1993 |
| DE | 42 01 136 A1 | 7/1993 |
| DE | 195 22 165 A1 | 12/1995 |
| DE | 195 11 548 A1 | 6/1996 |
| DE | 196 17 563 C1 | 6/1997 |
| DE | 196 07 151 C1 | 7/1997 |
| EP | 0 286 967 A2 | 10/1988 |
| EP | 0 298 240 B1 | 1/1989 |
| EP | 0 459 396 A1 | 12/1991 |
| EP | 0 485 179 A2 | 5/1992 |
| EP | 0 521 052 B1 | 1/1993 |
| EP | 0 545 974 B1 | 6/1993 |
| EP | 0 545 976 B1 | 6/1993 |
| EP | 0 598 916 A1 | 6/1994 |
| EP | 0 603 222 B1 | 6/1994 |
| EP | 0 628 134 B1 | 12/1994 |
| WO | WO 91/14855 | 10/1991 |
| WO | WO 92/03642 | 3/1992 |
| WO | WO 92/03643 | 3/1992 |
| WO | WO 93/06361 | 4/1993 |
| WO | WO 93/17228 | 9/1993 |
| WO | WO 94/21902 | 9/1994 |

* cited by examiner

Primary Examiner—Thomas Denion
Assistant Examiner—Binh Tran
(74) Attorney, Agent, or Firm—Laurence A. Greenberg; Werner H. Stemer; Gregory L. Mayback

(57) ABSTRACT

A method and a configuration are provided for monitoring a regeneratable $NO_x$-storage device in an exhaust gas line, in particular of a Diesel or a lean-burn engine, through which an $NO_x$-containing gas flows. A temperature measurement is carried out in the exhaust gas line and the operability, operating condition and/or storage capacity of the $NO_x$-storage device is inferred from the temperature measurement.

35 Claims, 2 Drawing Sheets

METHOD AND CONFIGURATION FOR MONITORING AN $NO_x$-STORAGE DEVICE

CROSS-REFERENCE TO RELATED APPLICATION

This application is a continuation of copending International Application No. PCT/EP98/01848, filed Mar. 30, 1998, which designated the United States.

BACKGROUND OF THE INVENTION

1. Field of the Invention

The present invention relates to a method and a configuration for monitoring a regeneratable $NO_x$-storage device in an exhaust gas line through which an $NO_x$-containing gas flows. The invention can be used in particular in relation to the monitoring of the exhaust gas of an internal combustion engine, especially Diesel and lean-burn engines.

Increasing environmental awareness and an ever increasingly strict exhaust gas legislation which that entails make it necessary for exhaust gas components that are classified as being harmful to be very substantially reduced. The three-way catalytic converter which is conventionally employed nowadays in motor vehicles is capable of converting carbon monoxide (CO), hydrocarbons (HC) and nitrogen oxides ($NO_x$). Monitoring and control of the catalytic converter is effected, for example, through the use of an oxygen probe. The probe detects a residual oxygen content in the exhaust gas, and the air-fuel ratio of the mixture to be fed to the engine is adjusted on the basis thereof. Suitable regulation of the residual oxygen content ensures that the catalytic converter adequately converts the exhaust gases. It is furthermore also known to ascertain the temperature profile at the catalytic converter and to use it as a warning or control parameter. A further development of that method makes it possible to ascertain the amount of heat which is liberated in the catalytic reaction and to draw conclusions about the exhaust gas characteristics of the engine by way of an entropy consideration, through the use of a lambda probe which is connected downstream of the catalytic converter. The three various possible ways of monitoring a three-way catalytic converter just described above are described in European Patent 0 298 240 B1.

An internal combustion engine in particular produces an increased level of pollutant emissions during a cold start phase. In order to reduce those pollutant emissions, heated catalytic converters are fitted in an exhaust gas line of the internal combustion engine. The mode of operation of a catalytic converter of that kind is to be found, for example, in International Publication No. WO 93/17228 or European Patent 0 628 134 B1 which is equivalent thereto. The use of adsorbers for the storage of unburnt hydrocarbons which are produced during the start phase, and the liberation thereof when the catalytic converter is in an operationally hot condition, are also part of the state of the art. Both are described, for example, in European Patent Application 0 485 179. It is precisely for the catalytic conversion of nitrogen oxides that zeolites and other materials which can also be used as a hydrocarbon storage device have proven to be suitable. Suitable catalysts are disclosed, for example, in European Patent Applications 0 459 396 and 0 286 967.

Therefore, as described above, the proper operability of a catalytic converter is monitored by checking its catalytic action during operation thereof. Various methods which are used for that purpose are described in International Publication No. WO 92/03643 or European Patent 0 545 976 B1 which is equivalent thereto, International Publication Nos. WO 94/21902 and WO 91/14855 or European Patent 0 521 052 B1 which is equivalent thereto, International Publication No. WO 92/03642 or European Patent EP 0 545 974 B1 which is equivalent thereto, and German Published, Non-Prosecuted Patent Application DE 26 43 739 A1. The latter discloses, for example, how the reaction which occurs at the catalytic converter is measured by way of temperature comparison measurement through the use of two temperature sensors. The temperature difference which is ascertained in that way gives an indication as to whether or not the catalytic converter is still operational. That mode of temperature monitoring can be employed not only in relation to a main catalytic converter but also in relation to a pre-catalytic converter.

For example, in the case of honeycomb bodies which are assembled from partially structured sheet layers, a temperature measurement sensor for monitoring purposes can be mounted between them. That is described in European Patent 0 603 221 B1.

The mode of operation of catalytic converters depends on the mode of operation of the internal combustion engine. In the case of stationary internal combustion engines, in Germany the TA-air is the regulation to be observed. Since the nitrogen oxide limitation depends on the fuel calorific efficiency of the internal combustion unit and on the kind of engine, the legislature introduced a so-called index-linking clause for compression ignition engines, which states that in accordance with the state of the art, engine-related and other measures are to be fully implemented for the reduction of emission levels. The background of the index-linking clause was the degree of development of nitrogen-removal installations, which was inadequate in 1985. Urea is used for nitrogen removal for stationarily operated internal combustion units.

In regard to internal combustion engines for motor vehicles, the planned use of urea fell through inter alia due to the requirement for a tank which had to be carried around for that purpose and the weight thereof. Based on the three nitrogen oxides which can be distinguished in terms of the formation thereof, more specifically fuel nitrogen oxide, prompt nitrogen oxide and thermal nitrogen oxide, other ways were sought for keeping down the formation of nitrogen oxide, in particular that of thermal nitrogen oxide. In relation to commercial vehicles, it is known to implement exhaust gas recycling with re-cooled exhaust gases. It is also known that the levels of $NO_x$-emission can be reduced by water injection. However, that option involves the problem of anti-frosting and carrying an operating agent which is water. Another way of reducing the levels of nitrogen oxide emissions is to provide for intermediate storage thereof. That is possible, for example, through the use of a storage device which contains barium or platinum.

SUMMARY OF THE INVENTION

It is accordingly an object of the invention to provide a method and a configuration for monitoring an $NO_x$ storage device, which overcome the hereinafore-mentioned disadvantages of the heretofore-known methods and configurations of this general type, with which an $NO_x$-storage device can be checked at least in terms of its operability and which can be used in an exhaust gas line in a particularly compact manner.

With the foregoing and other objects in view there is provided, in accordance with the invention, a method for monitoring a regeneratable $NO_x$-storage device in an exhaust gas line through which an $NO_x$-containing gas flows, which comprises measuring a temperature in the exhaust gas line; inferring at least a storage capacity of the $NO_x$-storage device from the measured temperature; computing $NO_x$ stored in the $NO_x$-storage device in dependence on the $NO_x$-containing gas flow; triggering a regeneration when a predeterminable limit value for the $NO_x$ is exceeded; and inferring at least one of operability, operating condition and storage capacity of the $NO_x$-storage device from the measured temperature during regeneration, by comparison with at least one of a predeterminable temperature value and a predeterminable temperature band width.

The term "exhaust gas line" is used to denote all of those conduits which carry away the exhaust gas originating from an $NO_x$-producing source, for example an internal combustion engine operability specifies whether or not the $NO_x$-storage device is at all still capable of storing nitrogen oxides. Through the use of the procedure for monitoring operability, by presetting a limit value or a band width with respect to the measured temperature, it is possible to provide a is checking procedure which is directed to operability of the $NO_x$-storage device, that complies with the exhaust gas requirements. The operating condition yields information which applies at least in regard to the moment in time of temperature measurement, with respect to evaluation of the performance of the storage device, for example in relation to predetermined exhaust gas limit values, temperatures, aging condition or the like, and is an item of qualitative information. In contrast, the storage capacity of the $NO_x$-storage device is an item of quantitative information which is absolute or which is related to a standard condition.

In accordance with another mode of the invention, the temperature measurement is implemented at a defined moment in time, which can advantageously be effected by control or even regulation for the $NO_x$-storage device or in conjunction with further apparatus controls that are additionally disposed in the exhaust gas line. According to an embodiment of the method, the defined moment in time is adjustable in accordance with the mode of operation of the $NO_x$-storage device. If the storage device is connected downstream of an internal combustion engine and if the engine is operated approximately under a constant load, the moment in time of temperature measurement is adjusted in such a way that limit value is certain not to be exceeded, with a known possible storage amount of $NO_x$ in the storage device. When taking a limit value of that kind into consideration, time-governed factors such as aging are also to be borne in mind, besides parameters such as structure, material and mode of operation of the $NO_x$-storage device. The monitoring operation is effected according to an embodiment of the method by continuous temperature measurement. According to another embodiment, it is effected by spaced-apart individual temperature measurements. In addition two or more successive temperature measurements can be combined together. According to a development of the method, in the event of successive temperature measurements, the spacing between them is reduced if the $NO_x$-storage device has a significant reduction in its capabilities. That ensures that its storage mode which is no longer tolerable is recorded at an early time and suitable measures can be taken.

In accordance with a further mode of the invention, temperature measurement in the exhaust gas line is effected either as direct temperature measurement of at least a part of the $NO_x$-storage device or as indirect temperature measurement through the use of the gas flow which flows through the $NO_x$-storage device. Direct temperature measurement is effected in the material of the storage device itself. For that purpose, a temperature sensor is disposed, for example, on a surface, in a top layer, or directly in the material of the $NO_x$-storage device. The nature of the flow sensor as well as the position at which it is disposed depends on the structure of the $NO_x$-storage device. The $NO_x$-storage device can be made from ceramic, by sintering or extrusion, but it can equally be made from metal sheets which are disposed in a layered configuration, for example in at least partially structured form. Sintering or extrusion of metal with ceramic powder is also found to be advantageous in order to be able to combine together the various properties of the materials involved. The $NO_x$-storage device can have a monolithic structure in the form of a honeycomb body. Other structural configurations are also possible. According to an advantageous embodiment, the $NO_x$-storing material is distributed in wall material, in particular in such a way that the storage capacity can be used in its entirety. Another advantageous embodiment provides for a coating, for example, on an $NO_x$-storage device which is made up of sheets. If the material of the $NO_x$-storage device affords poor thermal conductivity, the temperature sensor is to be disposed in the proximity of a surface over which the $NO_x$-containing gas flows. In the case of storage devices enjoying good thermal conductivity, for example metal storage devices, it is possible to use a temperature sensor as is disclosed in European Patent 0 603 222 BE1, which has already been referred to as the state of the art and the features of which form part of the content of this description. For that purpose it is necessary to ensure that the temperature measurement does not suffer from falsification effects due to the coating on a body of that kind.

In accordance with an added mode of the invention, indirect temperature measurement through the use of the gas flow which flows through the $NO_x$-storage device is implemented by a temperature sensor that is disposed in the gas flow. All suitable temperature sensors which are known in the state of the art such as thermo-elements or the like can be used for that purpose. The temperature sensor is disposed within the storage device in one of the passages. According to a further advantageous embodiment of the method, the temperature sensor is disposed in the gas flow downstream of the $NO_x$-storage device, in particular upstream of a three-way catalytic converter which is possibly connected downstream thereof. The concept of indirect temperature measurement can now also be most easily explained with reference to that configuration. More specifically, in that respect, the gas flow is used to draw conclusions about the $NO_x$-storage device.

Temperature measurement is effected before, during and/or after a regeneration phase of the $NO_x$-storage device. In regard to those defined moments in time, the following combinations have proven to be particularly advantageous:

temperature measurement during, before or after the regeneration phase: information in relation to the $NO_x$-storage device is possible by way of a measurement at a given moment in time or over a period of time;

temperature measurement immediately before the regeneration phase and during the same: it is possible to draw conclusions about the $NO_x$-storage device, from the temperature difference;

during and after the regeneration phase: this also permits a conclusion to be drawn about the storage device and in particular also the quality of regeneration, for example from a temperature difference;

immediately before and immediately after the regeneration phase: the temperature difference with respect to the two measurements also provides information in regard to the quality of regeneration, while it is again possible to deduce information therefrom regarding the $NO_x$-storage device; for information for the future, it has been found advantageous to link together at least two temperature measurement procedures after the regeneration phase; the temperature shift which occurs in that case, in relation to the spacing with respect to time of the two measurement operations, permits information in relation to time with respect to the performance of the $NO_x$-storage device; and combinations of the above temperature measurements: they give particularly accurate information in regard to the performance of the $NO_x$-storage device.

The temperature is measured in such a way that it directly permits a conclusion to be drawn about the operability, operating condition and/or storage capacity of the $NO_x$-storage device. That means that, in the case of a procedure of that kind, it is possible to draw conclusions about the storage device, based on the measured temperature, without further re-computation steps.

In accordance with an added mode of the invention, in order to provide for particularly significant information with respect to temperature measurement, it is advantageous if the regeneration phase is concluded within seconds, in particular within a second or less. Regeneration which gives rise to an exothermic reaction can be detected by a rise in temperature. That variation in temperature and the way in which the temperature varies can be detected on one hand at the storage device material itself and on the other hand at the gas flowing through the storage device. The shorter the regeneration phase for liberating the stored nitrogen oxides, the more clearly apparent is the rise in temperature. The endeavor therefore is to achieve a rise in temperature which occurs in a particularly abrupt manner over the entire cross-section of the $NO_x$-storage device. That can then be detected within or downstream of the storage device. That rise in temperature can be further increased by an oxidation effect also being triggered in the $NO_x$-storage device. This effect can be triggered by virtue of the exothermic reaction or by other measures, for example by virtue of a catalytic coating or the appropriate addition of a gas to the $NO_x$-containing gas flow which is passing through the storage device.

In accordance with an additional mode of the invention, the regeneration phase itself is caused by adding an agent for triggering regeneration, to the $NO_x$-containing gas flow. The agent is capable of releasing the stored nitrogen oxides. In particular, the agent is capable of participating with the nitrogen oxides themselves in a reaction. A development of the method provides for the addition of the regeneration-triggering agent in the $NO_x$-generating source itself. In accordance with yet another mode of the invention, particularly with that method, it is advantageous if the reactions which occur in the storage device are catalytically effected. For that purpose, for example, besides the storage device material, the $NO_x$-storage device also has a catalytic coating.

It is important that operation and/or the regeneration operation are effected in a controlled manner for temperature measurement just as for evaluation thereof. In the case of a regeneration-phase which takes place within tenths of a second, there are otherwise inaccuracies with regard to time, which would falsify the measurement result or results to such an extent that it is not possible to gather information regarding the performance of the $NO_x$-storage device, on the basis of the temperature involved. When using a common electronic system for the control of regeneration and temperature measurement, there is the further advantage of permitting the choice to be for a defined moment in time with respect to measurement or regeneration in combination, for example in dependence on higher-level aspects such as the mode of operation of an internal combustion engine.

In accordance with yet a further mode of the invention, with regard to the information about operability, the operating condition and/or the storage capacity of the $NO_x$-storage device, the temperature measurement operation is implemented in such a way that by virtue thereof it is possible to observe the variation in temperature in relation to time. In regard to catalytic converters, widely different temperature measurement procedures and evaluation methods are employed in order to be able to establish the activity of the catalytic converter and its performance, for example, for the future. It is also possible to use measuring methods of that kind, particularly for a method in which temperature is measured in connection with an $NO_x$-storage device regeneration phase. In that case, however, unlike a catalytic converter, in the case of an $NO_x$-storage device a phase in which the $NO_x$-storage device is not operating in the storage mode is taken as a basis for drawing conclusions about its capacity for storage purposes. The publications already referred to as the state of the art disclose various temperature evaluation methods, measuring locations and measuring sensors which can also be used in that case with suitable adaptation to the $NO_x$-storage device. In this respect the publications are in particular International Publication No. WO 94/21902, European Patent 0 521 052 B1, European Patent 0 545 974 B1, European Patent 0 603 222 B1, European Patent Application 0 545 976 and German Published, Non-Prosecuted Patent Application DE 26 43 739 A1, the corresponding features of which form part of the content of this description.

In accordance with yet an added mode of the invention, a functional relationship between the temperature, a characteristic of the $NO_x$-storage device and/or a gas constituent of the $NO_x$-containing gas is used for arriving at a conclusion about the operability, operating condition and/or storage capacity of the $NO_x$-storage device. For that purpose it is possible to use empirical values about the long-term performance of the $NO_x$-storage device as well as the relationships which arise out of the use of different materials for the $NO_x$-storage device. In regard to one or more gas constituents, the entropies or enthalpies thereof are suitable for monitoring the $NO_x$-storage device. That is possible, for example, by a modification to the method known from European Patent 0 298 240 B1 for monitoring the pollutant content of exhaust gases in internal combustion engines, which also forms part of the content of this description along with its corresponding features.

In accordance with yet an additional mode of the invention, a control or regulating procedure which, for example, is implemented by way of an electronic system for controlling the $NO_x$-source, establishes the size of the volume flow and the $NO_x$-proportion in the gas flow flowing through the storage device. The volume flow can be detected by way of known measuring methods, while the $NO_x$-proportion can be detected, for example, in the case of an internal combustion engine from a computation of the air-fuel mixture which is fed thereto. However, other data of the internal combustion engine such as the operational and/or condition data thereof can also be used for computational purposes. They can also be recorded in at least one performance graph and can be stored in such a way that an engine management system can use them. Something comparable can also be employed with suitable data in other areas of use of the invention. In order to prevent nitrogen oxides from flowing through the storage device without being stored, the limit value is established in such a way that this can be excluded. That limit value does not have to be fixed as a constant value. On the contrary, it can be adapted to the operability of the $NO_x$-storage device, for example by virtue of aging thereof, over a long period of operation.

The predeterminable temperature value and/or the predeterminable temperature band width can be crystallized out of empirical values for the $NO_x$-storage device which is respectively being used, and can be stored in a suitable electronic system. Those empirical values can also be predetermined in the form of a functional relationship, in which respect the most widely varying parameters such as aging, temperature, mode of operation and the like may also be involved.

In accordance with again another mode of the invention, a signal is triggered starting from a defined measured temperature, with the signal depending on an evaluation of operability, operating condition and/or storage capacity of the $NO_x$-storage device. In conjunction with available data about a storage device and predeterminable evaluation criteria, an evaluation in relation to the measured temperature can be of such a nature that the user is afforded any information such as the storage capacity that is still available, the probable service life or the like. The signal which is triggered starting from a defined, that is to say predeterminable temperature, is in particular also a warning signal which indicates an operational fault in good time. In addition, the signal which is triggered in that way can be used in such a way that a change in the exhaust gas flow is produced thereby. If, for example, the $NO_x$-storage device is in a condition which has only an extremely low level of storage capacity or if the storage device is suffering from damage, the mode of operation of the $NO_x$-source is preferably altered. For example, it can then be switched into an emergency program.

In accordance with again a further mode of the invention, a particularly preferred area of use of a method according to the invention is an internal combustion engine, in particular a Diesel or lean-burn engine, which preferably operates with fluctuations in load. A method of that kind can be used in particular in relation to motor vehicles. A further development provides that an HC-enriched and oxygen-rich gas flow is introduced into an $NO_x$-storage catalytic converter as an $NO_x$-storage device for regeneration purposes, wherein the gas flow is preferably enriched with HC to such an extent that the whole of the stored and convertible $NO_x$ is converted. That is generally firstly effected by the formation of $H_2O$ and CO from the HC and oxygen, while the CO then reacts with the is $NO_x$ to form $CO_2$ and $N_2$. Another development uses rich enrichment of the combustion mixture in the engine to produce sufficient hydrocarbons and CO. The $NO_x$-storage device is again subsequently regenerated by the formation of $H_2O$ and CO from hydrocarbons and oxygen upstream of the $NO_x$-storage device in the engine. Hydrocarbons and/or CO have proven themselves in that respect as being suitable for the regeneration operation.

The storage catalytic converter preferably has a coating including a mixture of oxidation and storage materials as well as a catalytically active material. However, it can itself also be made up completely from a mixture of those materials. The temperature rise in the $NO_x$-storage device regeneration phase depends on the degree of enrichment with hydrocarbons in the gas flow. The storage device is liberated as-completely as possible by way of the reaction of the nitrogen oxide with hydrocarbon to form nitrogen, water and carbon dioxide. It has been found particularly advantageous for the reaction to be caused to occur within about a second or less.

In an example for a lean-burn engine, one liter of storage volume corresponds to about 2 g of stored nitrogen oxide. This approximately corresponds to a distance traveled of between one and two miles, depending on the mode in which a motor vehicle is operating. The $NO_x$-storage device then has to be regenerated again. While the $NO_x$-storage catalytic converter has approximately a thermal capacity of 600 J/l/K, an exothermic energy of about 14 to 20 kJ per 2 g $NO_x$ is liberated. With a 100% conversion of the stored nitrogen oxides, it was possible to detect a temperature rise of 23 K on the basis of the CO-reaction and a temperature rise of 48 K on the basis of the HC-reaction.

Hydrocarbon enrichment is advantageously effected in such a way that all of the nitrogen oxide which is stored is converted. On the assumption of an adequate HC-content in the exhaust gas, the increase in temperature is proportional to the amount of nitrogen oxide being stored. The HC-addition can further be controlled in such a way that the storage device is progressively regenerated, by addition in relatively small metered amounts. When using suitable measurement sensors, it is once again possible to provide information about the capacity of portions of the storage device. If the added hydrocarbon for regeneration purposes is greater than necessary, the nitrogen oxides are completely converted, provided that they can also be completely released from the storage device. The unconverted hydrocarbons are advantageously converted in a subsequent three-way catalytic converter. The use of an electronic engine management system for temperature measurement, regeneration and arriving at information about operability, operating condition and/or storage capacity means that at any time there is access to the source producing the nitrogen oxide, namely the internal combustion engine. For regeneration purposes it is possible, for example, to cause an ignition misfire, whereby unburnt hydrocarbons reach the $NO_x$-storage device.

With the objects of the invention in view, there is also provided a configuration for monitoring a regeneratable $NO_x$-storage device by temperature measurement, comprising a device for regeneration of the $NO_x$-storage device; an exhaust gas flow passing through the $NO_x$-storage device and having a given flow direction; a temperature sensor disposed in the exhaust gas flow for monitoring the $NO_x$-storage device; an electronic component connected to the temperature sensor, for calculating a limit value for a nitrogen oxide storage capability of the $NO_x$-storage device and for triggering a regeneration for $NO_x$ when a predeterminable limit value is exceeded; a three-way catalytic converter disposed downstream of the $NO_x$-storage device in the given flow direction; the three-way catalytic converter having a given oxygen storage capability and the $NO_x$-storage device having an oxygen storage capability at least approximately one-third less than the given oxygen storage capability; an $NO_x$-source disposed upstream of the $NO_x$-storage device in the given flow direction; and a management system for at least one of controlling and regulating at least the electronic component for measuring temperature and for regeneration.

In accordance with another feature of the invention, there is provided a first lambda probe for checking a hydrocarbon-C-content upstream of the $NO_x$-storage device; a second lambda probe for checking the hydrocarbon-C-content downstream of the $NO_x$-storage device; and/or an internal combustion engine disposed upstream of the $NO_x$-storage device in the given flow direction.

In accordance with a further feature of the invention, there is provided an oxidation catalytic converter disposed upstream of the $NO_x$-storage device in the given flow direction, preferably closer to the $NO_x$-source than to the $NO_x$-storage device and in particular directly adjoining the $NO_x$-source.

In accordance with an added feature of the invention, the oxygen storage capability of the $NO_x$-storage device is at most approximately one-tenth of the given oxygen storage capability of the downstream three-way catalytic converter.

In accordance with an additional feature of the invention, the oxidation catalytic converter has a greater oxygen storage capability than the $NO_x$-storage device but a smaller oxygen storage capability than the given oxygen storage capability of the three-way catalytic converter.

In accordance with yet another feature of the invention, the $NO_x$-storage device has at most a vanishingly low capability for the storage of oxygen.

In accordance with yet a further feature of the invention, there is provided an exhaust gas line conducting the exhaust gas flow, the regeneratable $NO_x$-storage device being a catalytic converter having an oxidation capability, a storage capability for $NO_x$ and a temperature sensor for monitoring the regeneratable $NO_x$-storage device.

In accordance with yet an added feature of the invention, the oxidation capability concerns at least oxidation of carbon monoxide and hydrocarbons.

In accordance with a concomitant feature of the invention, the catalytic converter has an inflow end and a given length measured from the inflow end, and the temperature sensor in the catalytic converter is disposed downstream of approximately one-quarter and preferably approximately one half of the given length.

Other features which are considered as characteristic for the invention are set forth in the appended claims.

Although the invention is illustrated and described herein as embodied in a method and a configuration for monitoring an $NO_x$ storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
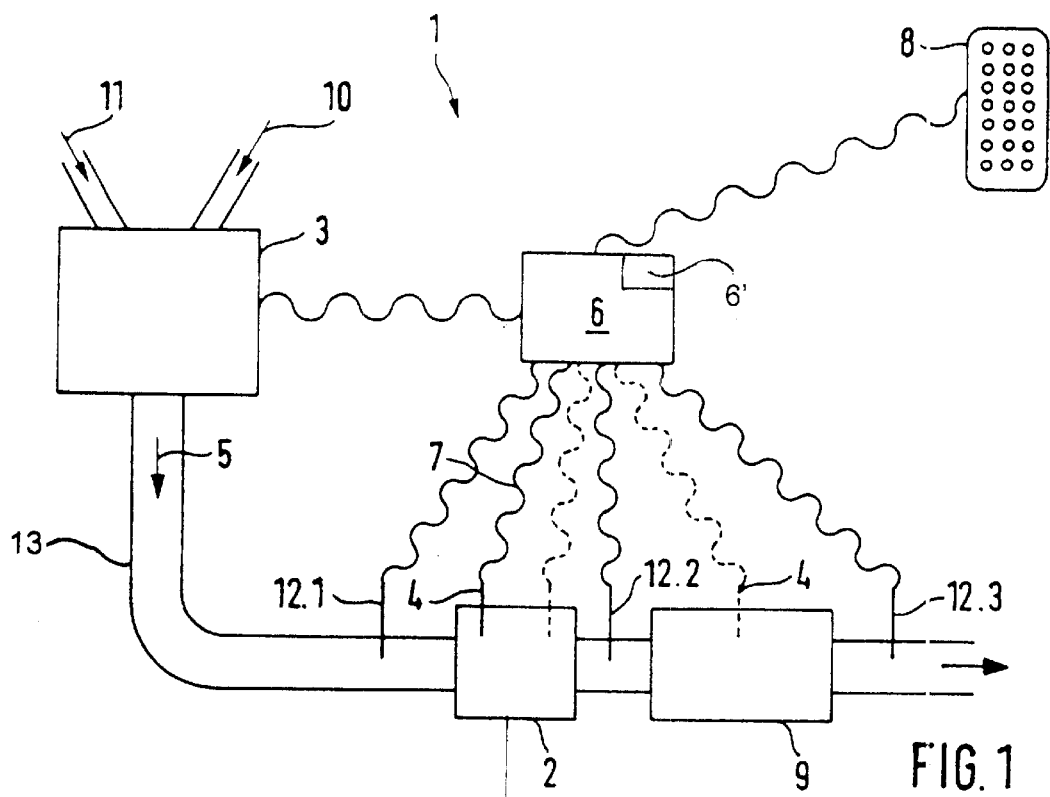
FIG. 1 is a block diagram of an internal combustion engine with a downstream $NO_x$-storage catalytic converter and a three-way catalytic converter.

Referring now to the figures of the drawings in detail and first, particularly, to FIG. 1 thereof, there is seen a configuration 1 for monitoring a regeneratable $NO_x$-storage device 2. In addition to the regeneratable $NO_x$-storage device 2, the configuration 1 has a device 16 for regeneration of the $NO_x$-storage device 2, an internal combustion engine 3 disposed upstream, a temperature sensor 4 in the $NO_x$-storage device 2 or in an exhaust gas flow 5 for monitoring the storage device 2 and an electronic component 6 which has a connection 7 to the temperature sensor 4. The electronic component 6 is preferably an engine control system which includes an electronic engine management system 6' for temperature measurement, regeneration and ascertaining operability, operating condition and/or storage capacity.

This engine control system 6 is programmable, with inputs being implemented by way of an input unit 8. A three-way catalytic converter 9 is connected downstream of the $NO_x$-storage device 2. The electronic component 6 computes a limit value for a nitrogen oxide storage capability of the $NO_x$-storage device 2 from a fuel flow 10 and an air flow 11 flowing to the internal combustion engine 3, in conjunction S with a mode of operation involved. Therefore, if the $NO_x$-storage device 2 is to be regenerated, the internal combustion engine 3 is operated in such a way that it has an ignition misfire and the exhaust gas flow 5 is thereby enriched with unburnt hydrocarbons. Other measures, such as suitable fuel injection into the exhaust gas flow 5, can also be implemented. If the added and unburnt hydrocarbon proportion is higher than is required for regeneration, the excess is converted in the catalytic converter 9. The configuration 1 additionally has a first lambda probe 12.1 upstream of the $NO_x$-storage device 2, a second lambda probe 12.2 between the storage device 2 and the catalytic converter 9 and a third lambda probe 12.3 downstream of the catalytic converter 9. The lambda probes serve for checking the hydrocarbon content of the exhaust gas flow 5 and can be used at the same time for controlling or regulating the internal combustion engine 3. However, it is also possible to employ temperature sensors in place of the lambda probes 12.1, 12.2 and 12.3. The three-way catalytic converter 9 itself also has a temperature sensor 4 for monitoring purposes. A broken connecting line from that temperature sensor 4 to the electronic component 6 shows the optional nature of that monitoring configuration. In another configuration the $NO_x$-storage device 2 has two or more temperature sensors 4, as is indicated by broken lines. Thus, in accordance with the illustrated configuration 1, it is possible to construct an apparatus for monitoring the regeneratable $NO_x$-storage device 2 in an exhaust gas line 13 through which the $NO_x$-containing gas 5 flows, with the storage device 2 being a catalytic converter. The catalytic converter has an oxidation capability which involves at least carbon monoxide and hydrocarbon. In the case of an apparatus of that kind, for temperature measurement, it has proven to be advantageous if the temperature sensor is disposed in the catalytic converter approximately downstream of a quarter of the length of the catalytic converter, as considered from the afflux end or inflow side. Preferably, it is disposed approximately at half the length of the catalytic converter.

Figure 2:
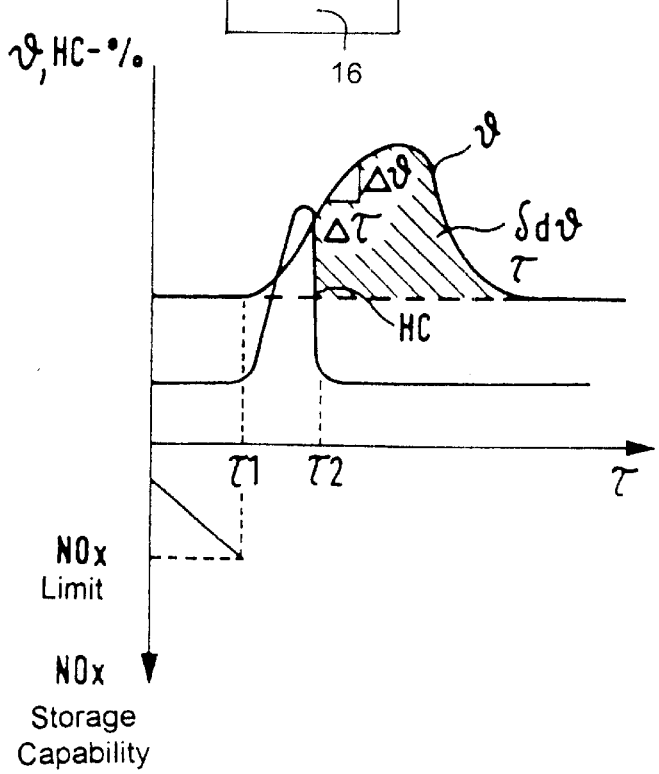
FIG. 2 is a graph of a regeneration phase for an $NO_x$-storage device in relation to time.

FIG. 2 shows a possible variation in temperature in an $NO_x$-storage catalytic converter, in relation to time. When a nitrogen oxide limit is reached, the exhaust gas flow is enriched with unburnt hydrocarbons at a time $\tau 1$ up to a time $\tau 2$. An exothermic reaction thereupon takes place in the $NO_x$-storage catalytic converter, which has the effect of producing a rise in temperature. The rise in temperature, indicated by a slope $\Delta \partial / \Delta \tau$ and integration, can be measured and evaluated.

Figure 3:
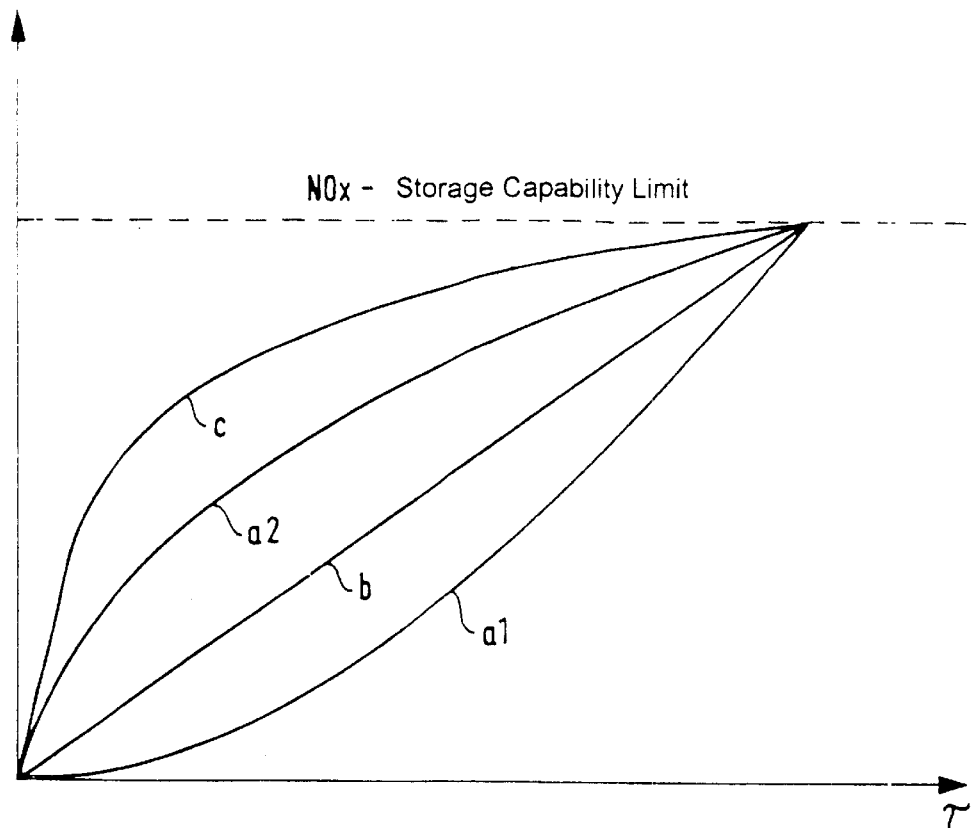
FIG. 3 is a graph showing various modes of performance of different $NO_x$-storage devices in relation to time.

FIG. 3 shows various variations in the storage of nitrogen oxides in an $NO_x$-storage device. A curve a1 occurs in accordance with a monotonically rising hyperbola function, a curve a2 occurs in accordance with a monotonically falling hyperbola function, a curve b is linear and a curve c occurs in accordance with a root function. Besides those curves, sinusoidal functions or others are also possible. Since the storage of nitrogen oxides triggers an endothermic reaction, that results in a fall in the temperature of the storage device. If the storage curve is known for a storage device, it is possible to produce a basis therefrom, with temperature, as a comparative value for temperature measurement. Then, that basis permits information to be afforded about the $NO_x$-storage device in conjunction with the measurement of a temperature immediately prior to, during or immediately after regeneration. In order to attain that basis it is possible, for example, to obtain a base temperature by way of an electrical resistance of the storage device or on the basis of empirical values.

Figure 4:
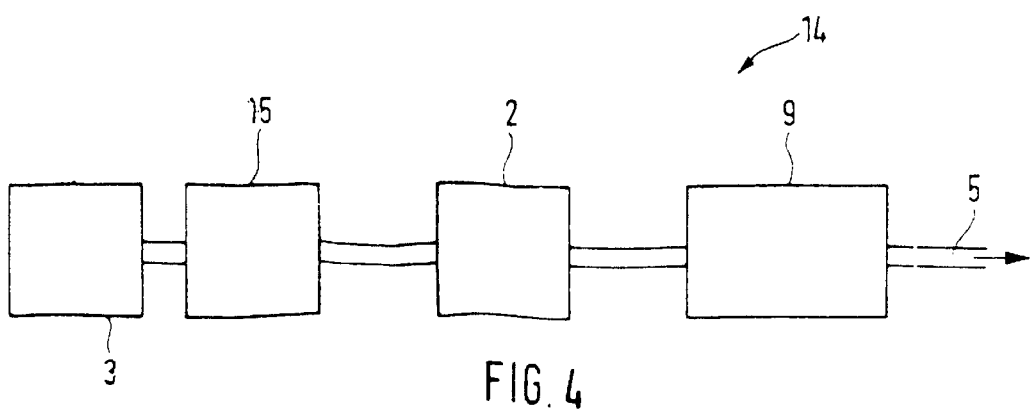
FIG. 4 is a block diagram of a configuration of an $NO_x$-source with an upstream oxidation catalytic converter.

FIG. 4 shows a further configuration 14 having an oxidation catalytic converter 15 which is disposed upstream of the $NO_x$-storage device 2 in flow direction and is located closer to the $NO_x$-source 3 than to the $NO_x$-storage device 2. When directly connected to the $NO_x$-source 2 the exhaust gas flow 5 very speedily heats the oxidation catalytic converter 15. In regard to the regeneration procedure, it has proven desirable if the exhaust gas for the regeneration procedure has a smaller oxygen content than in normal operation, for the improved establishment and formation of a characteristic temperature profile at the $NO_x$-storage device 2. That can be achieved, for example, by enriching a combustion mixture of an internal combustion engine. An oxygen storage capability with respect to the $NO_x$-storage device 2 is advantageously less than that of the subsequent three-way catalytic converter 9, preferably approximately only a third thereof and in particular less than a tenth or even less. The exhaust gas flow 5 can then still be so rich that it is converted in any event while the $NO_x$-storage device 2 once again does not heat up excessively by virtue of an exothermic reaction. The oxidation catalytic converter 15 therefore also has a greater oxygen storage capability than the $NO_x$-storage device 2, but a smaller oxygen storage capability than the three-way catalytic converter 9. The $NO_x$-storage device 2 in particular has at most a vanishingly low capability for the storage of oxygen or no capability whatsoever for that purpose.

The present invention succeeds in providing for reliable monitoring of the nitrogen oxide emission from $NO_x$-sources by using and checking a storage device, thereby making it possible to observe future exhaust gas limit values, for example in the case of Diesel or lean-burn engines for motor vehicles.

We claim:

1. In a method for monitoring a regeneratable $NO_x$-storage device in an exhaust gas line through which an $NO_x$-containing gas flows, the improvement which comprises:
   measuring a temperature in the exhaust gas line;
   inferring at least a storage capacity of the $NO_x$-storage device from the measured temperature;
   computing $NO_x$ stored in the $NO_x$-storage device in dependence on the $NO_x$-containing gas flow;
   triggering a regeneration when a predeterminable limit value for the $NO_x$ is exceeded; and
   inferring at least one of operability, operating condition and storage capacity of the $NO_x$-storage device from the measured temperature during regeneration, by comparison with at least one of a predeterminable temperature value and a predeterminable temperature band width.

2. The method according to claim 1, which comprises carrying out the step of measuring the temperature at a defined moment in time.

3. The method according to claim 1, which comprises directly measuring a temperature of at least a part of the $NO_x$-storage device, at least one of before, during and after a regeneration phase of the $NO_x$-storage device.

4. The method according to claim 1, which comprises indirectly measuring a temperature of at least a part of the $NO_x$-storage device using a gas flow flowing through the $NO_x$-storage device, at least one of before, during and after a regeneration phase of the $NO_x$-storage device.

5. The method according to claim 1, which comprises measuring a temperature of at least a part of the $NO_x$-storage device, for directly permitting a conclusion to be drawn about at least one of operability, operating condition and storage capacity of the $NO_x$-storage device.

6. The method according to claim 1, which comprises using a functional relationship between at least one of temperature, a characteristic of the $NO_x$-storage device and a gas constituent of the $NO_x$-containing gas to draw a conclusion about at least one of operability, operating condition and storage capacity of the $NO_x$-storage device.

7. The method according to claim 1, which comprises measuring a temperature of at least a part of the $NO_x$-storage device, at least one of before, during and after a regeneration phase of the $NO_x$-storage device, and concluding the regeneration phase within seconds.

8. The method according to claim 1, which comprises measuring a temperature of at least a part of the $NO_x$-storage device, at least one of before, during and after a regeneration phase of the $NO_x$-storage device, and concluding the regeneration phase within at most one second.

9. The method according to claim 1, which comprises observing a variation in the temperature with respect to time.

10. The method according to claim 1, which comprises measuring a temperature of at least a part of the $NO_x$-storage device, at least one of before, during and after a regeneration phase of the $NO_x$-storage device, and carrying out the regeneration phase by adding an agent to the $NO_x$-containing gas flow for triggering regeneration.

11. The method according to claim 1, which comprises catalytically carrying out a reaction in the $NO_x$-storage device.

12. The method according to claim 1, which comprises connecting the $NO_x$-storage device downstream of an internal combustion engine, and monitoring the $NO_x$-storage device.

13. The method according to claim 1, which comprises connecting the $NO_x$-storage device downstream of a Diesel engine, and monitoring the $NO_x$-storage device.

14. The method according to claim 1, which comprises connecting the $NO_x$-storage device downstream of a lean-burn engine, and monitoring the $NO_x$-storage device.

15. The method according to claim 12, which comprises introducing a gas flow enriched with at least one of hydrocarbons and CO into an $NO_x$-storage catalytic converter acting as the $NO_x$-storage device for performing the regeneration step.

16. The method according to claim 15, which comprises carrying out the introducing step with a rich combustion mixture.

17. The method according to claim 15, which comprises enriching the gas flow with at least one of hydrocarbons and CO to such an extent that all stored and convertible $NO_x$ is converted.

18. The method according to claim 12, which comprises subsequently regenerating the $NO_x$-storage device and further reacting the CO with the $NO_x$ to yield $N_2$ and $CO_2$, due to a formation of $H_2O$ and CO from hydrocarbons and oxygen upstream of the $NO_x$-storage device.

19. The method according to claim 12, which comprises subsequently regenerating the $NO_x$-storage device and further reacting the CO with the $NO_x$ to yield $N_2$ and $CO_2$, due to a formation of $H_2O$ and CO from hydrocarbons and oxygen upstream of the $NO_x$-storage device in the engine.

20. The method according to claim 12, which comprises carrying out the steps of temperature measurement, regeneration and ascertaining at least one of operability, operating condition and storage capacity with an electronic engine management system.

21. The method according to claim 1, which comprises triggering a signal starting from a defined measured temperature, and making the signal dependent on an evaluation of at least one of operability, operating condition and storage capacity of the $NO_x$-storage device.

22. The method according to claim 1, which comprises triggering a signal starting from a defined measured temperature, and causing a variation in the $NO_x$-containing gas flow with the signal.

23. In a configuration for monitoring a regeneratable $NO_x$-storage device by temperature measurement, the improvement comprising:

a device for regeneration of the $NO_x$-storage device;

an exhaust gas flow passing through the $NO_x$-storage device and having a given flow direction;

a temperature sensor disposed in said exhaust gas flow for monitoring the $NO_x$-storage device;

an electronic component connected to said temperature sensor, for calculating a limit value for a nitrogen oxide storage capability of the $NO_x$-storage device and for triggering a regeneration for $NO_x$ when a predeterminable limit value is exceeded;

a three-way catalytic converter disposed downstream of the $NO_x$-storage device in said given flow direction;

said three-way catalytic converter having a given oxygen storage capability and the $NO_x$-storage device having an oxygen storage capability at least approximately one-third less than said given oxygen storage capability;

an $NO_x$-source disposed upstream of the $NO_x$-storage device in said given flow direction; and a management system for at least one of controlling and regulating at least said electronic component for measuring temperature and for regeneration.

24. The configuration according to claim 23, including:

a first lambda probe for checking a hydrocarbon-C-content upstream of the $NO_x$-storage device; and a second lambda probe for checking the hydrocarbon-C-content downstream of the $NO_x$-storage device.

25. The configuration according to claim 23, wherein said $NO_x$-source is an internal combustion engine disposed upstream of the $NO_x$-storage device in said given flow direction.

26. The configuration according to claim 23, including an oxidation catalytic converter disposed upstream of the $NO_x$-storage device in said given flow direction.

27. The configuration according to claim 26, wherein said oxidation catalytic converter is disposed closer to said $NO_x$-source than to the $NO_x$-storage device.

28. The configuration according to claim 26, wherein said oxidation catalytic converter directly adjoins said $NO_x$-source.

29. The configuration according to claim 23, wherein the oxygen storage capability of the $NO_x$-storage device is at most approximately one-tenth of said given oxygen storage capability of said downstream three-way catalytic converter.

30. The configuration according to claim 26, wherein said oxidation catalytic converter has a greater oxygen storage capability than the $NO_x$-storage device but a smaller oxygen storage capability than said given oxygen storage capability of said three-way catalytic converter.

31. The configuration according to claim 23, wherein the $NO_x$-storage device has at most a vanishingly low capability for the storage of oxygen.

32. The configuration according to claim 23, including an exhaust gas line conducting said exhaust gas flow, said regeneratable $NO_x$-storage device being a catalytic converter having an oxidation capability, a storage capability for $NO_x$ and a temperature sensor for monitoring the regeneratable $NO_x$-storage device.

33. The configuration according to claim 32, wherein said oxidation capability concerns at least oxidation of carbon monoxide and hydrocarbons.

34. The configuration according to claim 32, wherein said catalytic converter has an inflow end and a given length measured from said inflow end, and said temperature sensor in said catalytic converter is disposed downstream of approximately one-quarter of said given length.

35. The configuration according to claim 32, wherein said catalytic converter has an inflow end and a given length measured from said inflow end, and said temperature sensor in said catalytic converter is disposed downstream of approximately one-half of said given length.

* * * * *